(12) United States Patent
Chen et al.

(10) Patent No.: US 9,190,780 B2
(45) Date of Patent: Nov. 17, 2015

(54) POWER OUTLET CAPABLE OF PROVIDING POWER IN A CONTROLLED MANNER AND METHOD FOR CONFIGURING THE SAME

(75) Inventors: Chun-Chuan Chen, New Taipei (TW); Wei-Ching Lee, New Taipei (TW)

(73) Assignee: POWERTECH INDUSTRIAL CO., LTD., New Taipei (TW)

( * ) Notice: Subject to any disclaimer, the term of this patent is extended or adjusted under 35 U.S.C. 154(b) by 769 days.

(21) Appl. No.: 13/461,735

(22) Filed: May 1, 2012

(65) Prior Publication Data
US 2013/0026853 A1    Jan. 31, 2013

(30) Foreign Application Priority Data
Jul. 27, 2011 (TW) .............................. 100126625 A (51) Int. Cl.
| | | |
|---|---|---|
| H01H 35/00 | (2006.01) | |
| H01R 13/66 | (2006.01) | |
| H01R 24/22 | (2011.01) | |
| H02J 7/00 | (2006.01) | |

(52) U.S. Cl.
CPC ............ *H01R 13/6675* (2013.01); *H01R 24/22* (2013.01); *H02J 7/0031* (2013.01); *Y10T 307/766* (2015.04)

(58) Field of Classification Search
CPC combination set(s) only.
See application file for complete search history.

(56) References Cited

U.S. PATENT DOCUMENTS

| | | | |
|---|---|---|---|
| 6,731,024 B1 | 5/2004 | Molnar et al. | |
| 2009/0307505 A1* | 12/2009 | Robertson et al. | ............ 713/300 |
| 2010/0194358 A1 | 8/2010 | Stanford-Clark | |

FOREIGN PATENT DOCUMENTS

| | | |
|---|---|---|
| CN | 1607805 A | 4/2005 |
| CN | 201222580 Y | 4/2009 |
| CN | 102017329 A | 4/2011 |
| CN | 201813011 U | 4/2011 |
| TW | 472405 | 1/2002 |
| TW | 573815 | 1/2004 |
| TW | M400628 | 3/2011 |

\* cited by examiner

*Primary Examiner* — Jared Fureman
*Assistant Examiner* — Aqeel Bukhari
(74) *Attorney, Agent, or Firm* — Li & Cai Intellectual Property (USA) Office (57) ABSTRACT

A power outlet capable of providing power in a controlled manner is disclosed. The power outlet may include a notification unit, a power input unit for receiving a power, a power output unit for outputting the power, a switching unit having a controlled switch for controlling the whether the power input unit is connected to the power output unit, in order to control a power supply mode of the power outlet, a configuration unit for generating a configuration signal, and a control unit, according to the configuration signal, for setting up an initial time value, driving the notification unit to generate a first notification signal, and counting down from the initial time value.

11 Claims, 9 Drawing Sheets

POWER OUTLET CAPABLE OF PROVIDING POWER IN A CONTROLLED MANNER AND METHOD FOR CONFIGURING THE SAME

BACKGROUND OF THE INVENTION

1. Field of the Invention

The instant disclosure relates to a power outlet, and more particularly, to a power outlet capable of providing power in a controlled manner and a method for powering the same.

2. Description of Related Art

Generally, current-existing electronic devices are capable of being recharged repeatedly when rechargeable batteries serve as one of their primary source of power. However, when the electronic devices with the rechargeable batteries are overly charged the life of the batteries may shorten and the electronic devices may be even damaged.

As such, a power outlet that is capable of not only continuing the power supply with the electronic devices and being able to cut off the power supply before the electronic devices become fully charged may minimize the occurrence of the batteries of the electronic device being overly charged and prevent the electronic devices from being damaged as the result.

SUMMARY OF THE INVENTION

The primary objective of the instant disclosure is to provide a power outlet that could be providing power in a controlled manner so that electronic devices connected to the power outlet may not be overly charged.

The power outlet according to one embodiment of the instant disclosure may include a notification unit, a power input unit for receiving a power, a power output unit for outputting the power, a switching unit having a controlled switch, for controlling the power input unit to be connected to or disconnected from the power output unit, in order to control a power supply mode of the power outlet, a configuration unit for generating a configuration signal, and a control unit, according to the configuration signal, for setting up an initial time value, driving the notification unit to generate a first notification signal, and counting down from the initial time value. Specifically, when the control unit counts down from the initial time value to a point where a predetermined condition is satisfied the control unit is configured to drive the notification unit to generate a second notification signal. Also, when the control unit counts down from the initial time value to zero the control unit is configured to cause the switching unit to switch the power supply mode.

In order to further the understanding regarding the instant disclosure, the following embodiments are provided along with illustrations in the follows.

DETAILED DESCRIPTION OF THE EMBODIMENTS OF INSTANT DISCLOSURE

The aforementioned illustrations and following detailed descriptions are exemplary for the purpose of further explaining the scope of the instant disclosure. Other objectives and advantages related to the present instant disclosure will be illustrated in the subsequent descriptions and appended drawings.

First Embodiment of the Instant Disclosure

Figure 1:
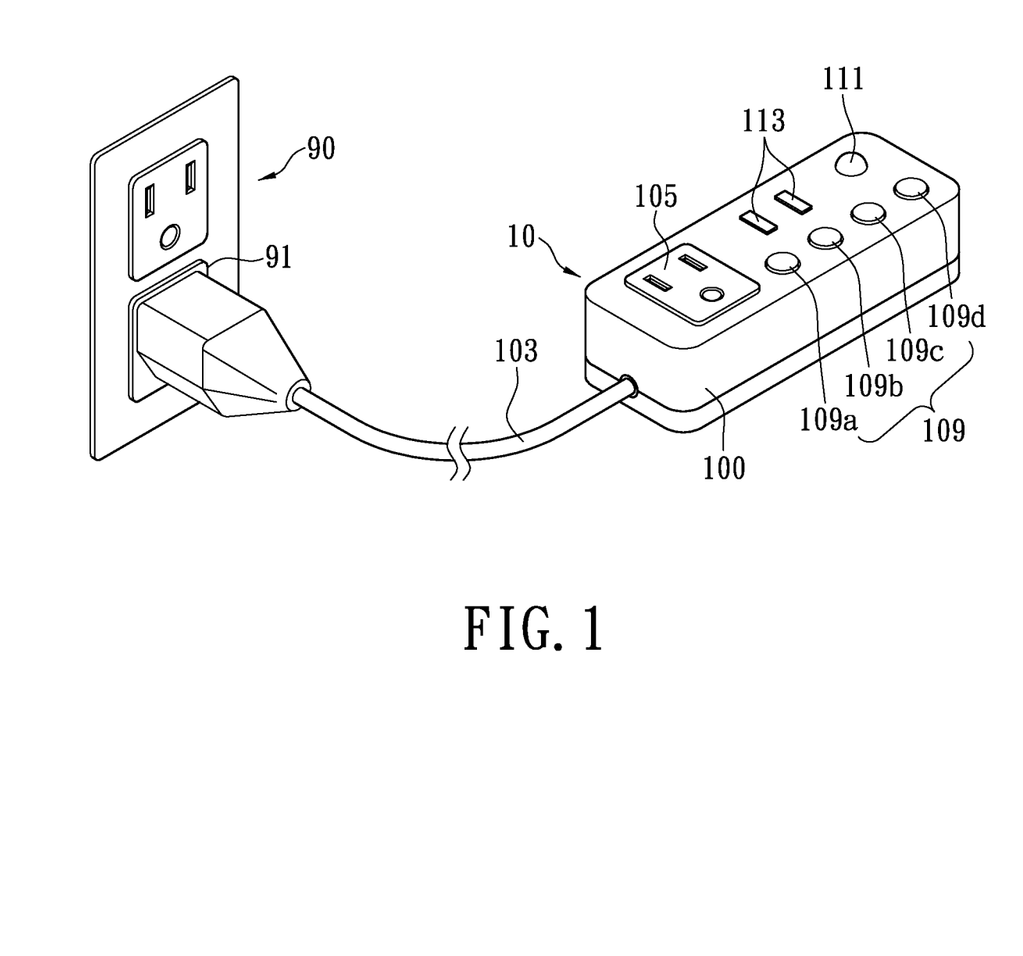
FIG. 1 shows a schematic diagram of a power outlet capable of providing power in a controlled manner according to one embodiment of the instant disclosure.
Figure 2:
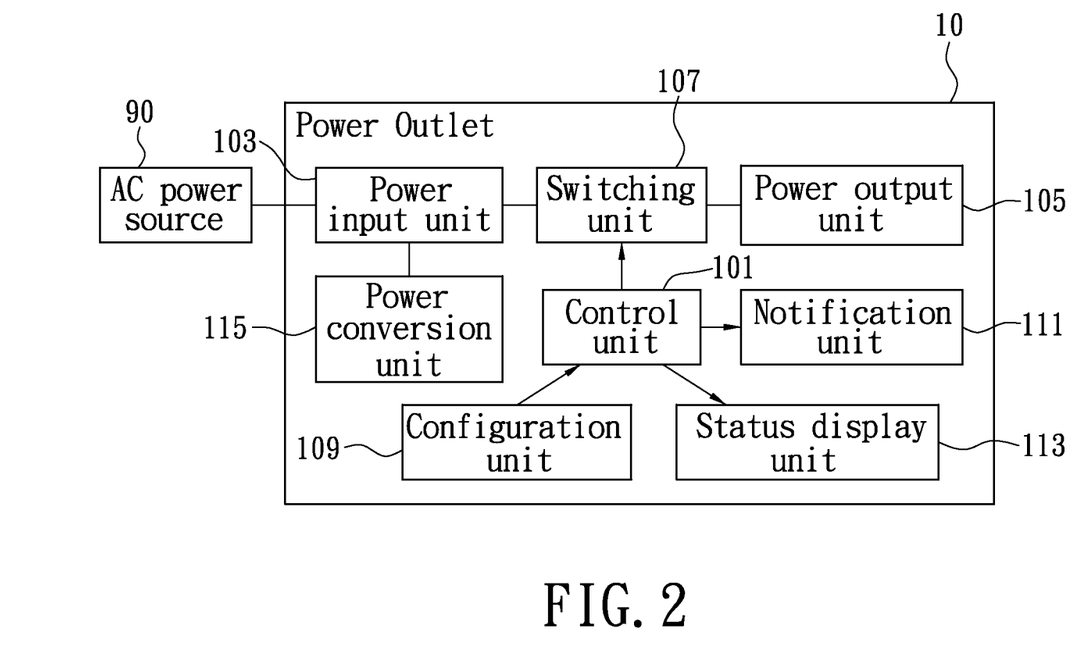
FIG. 2 shows a simplified block diagram of a power outlet capable of providing power in a controlled manner according to one embodiment of the instant disclosure.

Please refer to both FIGS. 1 and 2, which are a schematic diagram of a power outlet capable of providing power in a controlled manner and a simplified block diagram for the same, respectively. As shown in FIGS. 1 and 2, an alternating current (AC) power source 90 supplies an AC power (or a city power) through a city power socket 91 electrically connected to the AC power source. A power outlet capable of providing power in a controlled manner (hereinafter referred to as "power outlet") 10 may be coupled to the city power socket 91 for receiving the AC power (or the city power). The power outlet 10 may therefore provide the AC power or the city power to a load (not shown) received in the city power socket 91, therefore forming a closed circuit along with the AC power source 90. The power outlet 10 may be controlled in a predetermined fashion so that the power outlet 10 may deliver the AC power to the load at a first predetermined point while stopping delivering the AC power to the same at a second predetermined point.

The power outlet 10 may further include a control unit 101, a power input unit 103, a power output unit 105, a switching unit 107, a configuration unit 109, a notification unit 111, a status display unit 113, and a power conversion unit 115. The switching unit 107, the configuration unit 109, the notification unit 111, and the status display unit 113 may be coupled to the control unit 101. The switching unit 107 may be also coupled between the power input unit 103 and the power output unit 105, with the power conversion unit 115 coupled to the power input unit 103. The aforementioned components (e.g., the control unit 101) may be placed within a housing 100 of the power outlet 10.

The control unit 101 may be including a microprocessor and related circuitry in one implementation and may be programmable through firmware stored therein. The microprocessor may further include a counter. And the power input unit 103 and the power output unit 105 may serve as a power input end and a power output end for the power outlet 10, respectively. The power input unit 103 may be configured to receive the AC power from the AC power source 90 while the power output unit 105 may be configured to output power that may be processed by the power outlet 10 on basis of the received AC power. The power input unit 103 may be equipped with a power plug capable of being received by the city power socket 91, with the power output unit 105 having a power socket for receiving the load.

The power outlet 10 may be providing power in two power supply modes. In a first power supply mode, the power output unit 105 may be coupled to the power input unit 103 and the power outlet 10 may supply the power to the load. In a second power supply mode, the power output unit 105 may be disconnected from the power input mode 103 and thus the power outlet 10 may not deliver the power to the load. And also in the second power supply mode the switching unit 107 may be controlled by the control unit 101 before controlling the connection/disconnection between the power input unit 103 and the power output unit 105.

The configuration unit 109 may serve as an interface for operations of the power outlet 10. The configuration unit 109 may include a button, which may be activated externally and may generate corresponding signals to the control unit 101 responding to an external activation. The status display unit, meanwhile, may be controlled by the control unit 101 for displaying the power supply mode of the power outlet 10. In one implementation, the status display unit 113 may include lighting elements of multiple colors, which may or may not emit their lights based on the power supply mode in which the power outlet 10 is.

The notification unit 111, which may be also controlled by the control unit 101, may serve as an interface for presenting the information of the power outlet 10. For example, the notification unit 111 may be implemented in terms of a lighting element as well such as a light emitting diode (LED) or a light bulb. In another implementation, the notification unit 111 may be a sounding element including but not limited to a buzzer or a horn, or implemented in other forms so long as human operators may be notified.

The control unit 101 may cause the notification unit 111 to operate in a predetermined manner so as to present the information regarding the operation of the power outlet 10. For example, the lighting elements of the notification unit 111 may emit their lights in a predetermined frequency. In another implementation, the sounding element of the notification unit 111 may sound its alarm in another predetermined frequency. Also, the lighting elements and/or the sounding element in the notification unit 111 may be caused to emit the lights or sound the alarm for a number of times, respectively, with the number directly relating to the operation of the power outlet. Using the above lighting elements/sounding element for example, that when the lighting elements emit their lights and/or the sounding element sound the alarm for three times may indicate there are three hours before the power outlet 10 may be switching the power supply mode thereof. The number and the frequency of the lighting elements emitting the lights and/or the sounding element sounding the alarm collectively may be indicative of the operation of the power outlet as well. For instance, that the lighting elements emit the lights for a predetermined number (e.g., 10) of the times in a predetermined frequency (e.g., 10 times per minute) may be used to indicate that there is still one hour left before the power outlet 10 may switch the power supply mode thereof. And when the lighting elements emit the lights less than 10 times in another frequency that is less than 10 times per minute there may be less than one hour before the switch to the power supply mode of the power outlet 10.

Since the control unit 101, the notification unit 111, and the display unit 113 may be powered by a direct current (DC) power source, the power conversion unit 115 may be configured to convert the received AC power to corresponding DC powers for the control unit 101, the notification unit 111, and the display unit 113. It is worth noting that the control unit 101, the notification unit 111, and the display unit 113 may be battery-powered.

Figure 3:
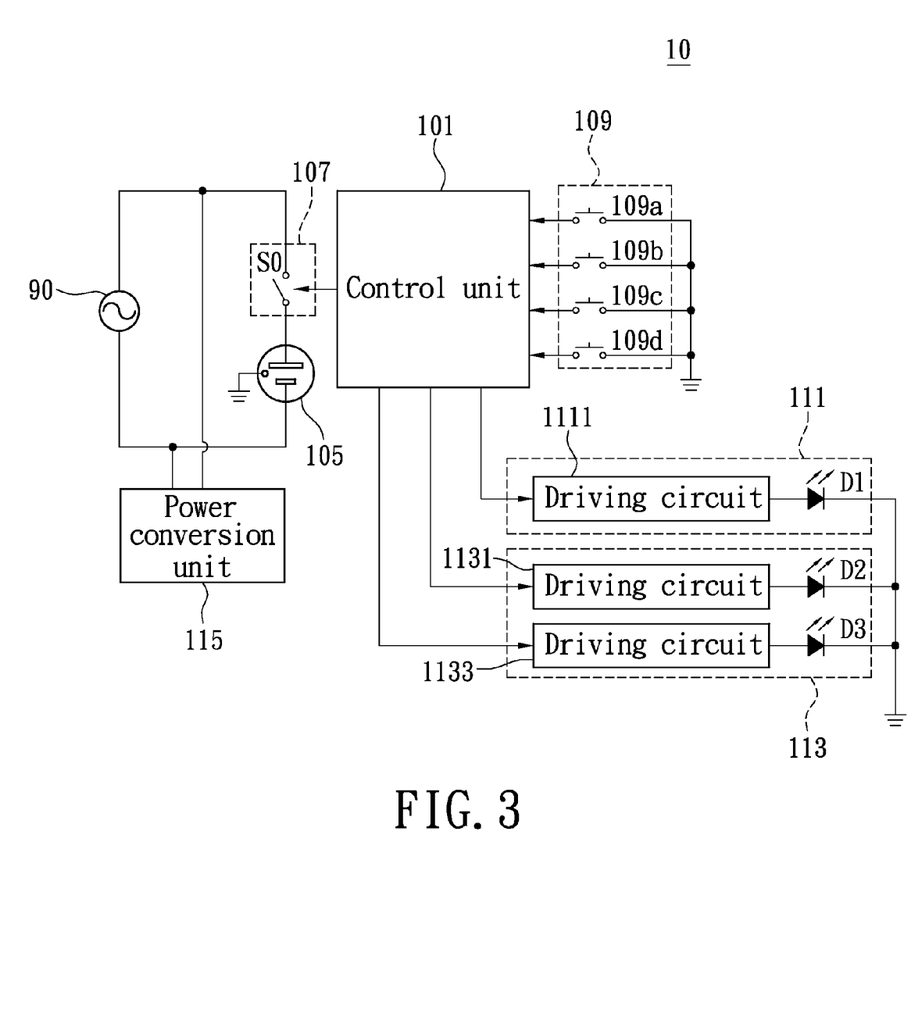
FIG. 3 shows a circuit block diagram of a power outlet according to one embodiment of the instant disclosure.

In conjunction with FIGS. 1 and 2, FIG. 3 illustrates a circuit block diagram of a power outlet according to one embodiment of the instant disclosure. The switching unit 107 may include a controlled switch S0 coupled to the closed circuit formed by the power output unit 105 and the AC power source 90. The controlled switch S0 may be adapted to receive switching signals from the control unit before the controlled switch S0 may switch. And the switch to the controlled switch S0 may further cause the power output unit 105 to be connected to or disconnected from the AC power source, facilitating the switch to the power supply mode of the power outlet 10. In one implementation, the controlled switch S0 may be a relay or other switching elements controllable by electronic signals.

The notification unit 111 may include a driving circuit 1111 and a lighting element D1. Driving signals outputted by the control unit 101 may be amplified by the driving circuit 1111 so as to cause the lighting element D1 to emit the light, serving to facilitate the presentment of the information regarding the operation of the power outlet 10.

The status display unit 113 may include driving circuits 1131 and 1133 and lighting elements D2 and D3. The driving circuits 1131 and 1133 may be coupled between the control unit 101 and the lighting element D2 and between the control unit 101 and the lighting element D3, respectively. Accordingly, driving signals generated for driving of the lighting elements D2 and D3 may be amplified. The lighting elements D2 and D3 may emit the lights of different colors for indicating different power supply modes. In another implementation, the lighting elements D2 and D3 may emit the lights of the same color with the lighting elements D2 and D3 emitting the lights for indicating a first predetermined power supply mode of the power outlet 10 and the lighting elements D2 and D3 failing to emit the lights for indicating a second predetermined power supply mode of the power outlet 10.

As shown in FIGS. 1 and 3, the configuration unit 109 may include multiple buttons 109a to 109d disposed on a surface of the housing 100. When the buttons 109a to 109d are activated, configuration signals may be delivered to the control unit 101, which in turn may set up when to switch the power supply mode of the power outlet 10 accordingly as each of the buttons 109a to 109d may correspond to its respective length of the time. For example, the button 109a may correspond to the length of the time of one hour while the button 109b may correspond to the length of the time of three hours. And when the button 109a is activated the control unit 101 may count one hour before causing the power outlet 10 to switch the power supply mode thereof, and when the button 109b is activated the power outlet 10 may switch the power supply mode thereof three hours later.

In another implementation, the buttons 109a to 109d may correspond to predetermined delays of the time, which may be further added to or reduced from a predetermined length of the time for the switch of the power supply mode of the power outlet 10. Specifically speaking, the button 109a may correspond to 0.5 hours in the delay of the time and when the button 109a is activated the power outlet 10 may switch from the current power supply mode to another power supply mode 3.5 hours later (assume the predetermined length of the time for the switch is 3 hours). It is worth noting that when the configuration unit 109 employs the predetermined delay of the time for setting up when the power outlet 10 switches a predetermined settling period for the actual delay of the time would be in place so as to ensure information of the intended delay of the time for the switch to the power supply mode of the power outlet is actually received by the control unit 101.

Please refer back to FIG. 2. When the power outlet 10 is intended to switch the power supply mode thereof at the first predetermined point, the first predetermined point may be configured by the configuration unit 109, which may deliver the corresponding configuration signal to the control unit 101. And the control unit 101 upon receiving the configuration signal may cause the power outlet 10 to switch the power supply mode at the first predetermined point by setting up an initial time value, and drive the notification unit 111 for the generation of a first notification signal. The control unit 101 may count down from the initial time value and when the countdown from the initial time value satisfies a predetermined condition the notification unit 111 may be further caused to generate a second notification signal. When the first predetermined point is reached, the control unit 101 may cause the switching unit 107 to switch the power supply mode of the power outlet 10.

The first notification signal may be adapted to notify the human operators that the power outlet 10 has received the configuration setting for the switch to the power supply mode thereof. And the first notification signal may present the information of the initial time value. Specifically, the control unit 101 may cause the lighting elements to emit the lights for three times to indicate the initial time value has been set to three hours when the notification unit 111 employs the lighting elements to present the first notification signal. In addition to the number of the lighting elements emitting the lights, the frequency of the lighting elements emitting the lights may also serve the same purpose of indicating the initial time value.

The second notification signal may be generated when the predetermined condition is satisfied for informing the human operators of how much time left before the switch to the power supply mode of the power outlet 10 may start. And the second notification signal may be presented by having the lighting elements of the notification unit 111 to emit the lights for two times when there are two hours left before the switch to the power supply mode of the power outlet may start. Similarly, the lighting elements of the notification unit 111 may be controlled to emit the light once in order to indicate that there is only one hour left before the switch to the power supply mode of the power outlet 10. In addition to the number of the lighting elements emitting the lights, the frequency of the lighting elements emitting the lights may also serve the same purpose of indicating how much time left before the switch to the power supply mode of the power outlet 10 may start.

A third notification signal may be generated when the countdown from the initial time value reaches zero at which point the control unit 101 may cause the notification unit 111 to prepare the third notification signal for indicating the power supply mode of the power outlet 10 may switch soon. When the lighting elements are utilized in the notification unit 11, the lighting elements may be configured to emit the lights in another predetermined frequency for indicating the countdown to zero is approaching. Moreover, when the sounding element is used in the notification unit 111 the sounding element may sound the buzzer more frequently to achieve the same goal of notifying the switch to the power supply mode of the power outlet 10 may begin soon.

Figure 4:
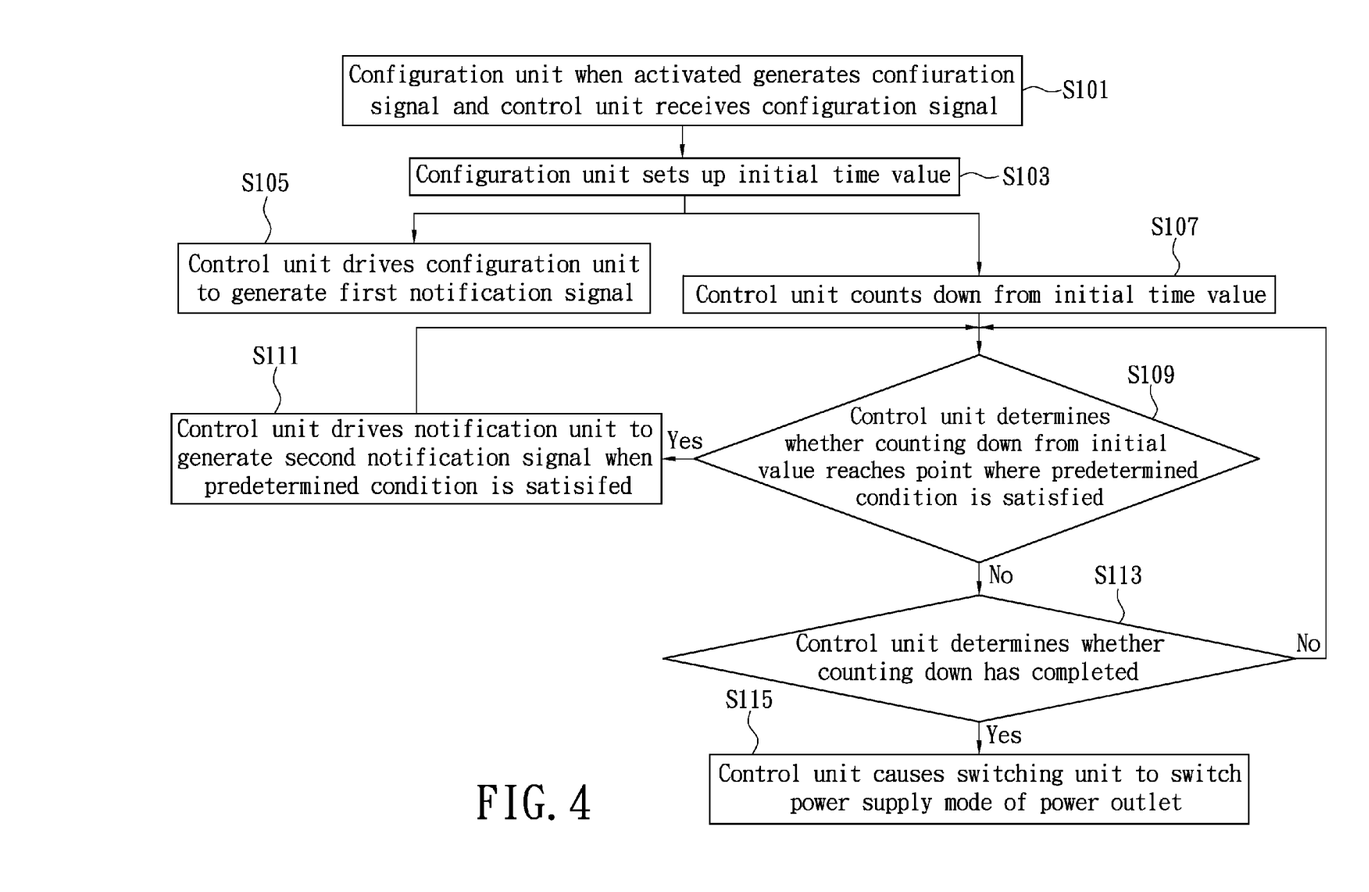
FIG. 4 is a flow chart illustrative of a configuration method for causing a power outlet to provide power in a controlled manner according to one embodiment of the instant disclosure.

Please refer to FIG. 4 showing a flow chart illustrative of a configuration method for causing a power outlet to be providing power in a controlled manner according to one embodiment of the instant disclosure. In conjunction with FIG. 2, the configuration method may include causing the configuration unit 109 to generate the configuration signal, which may be received by the control unit 101, when the power outlet 10 is in the first power supply mode (step S101). In one implementation, when the power outlet 10 is in the first power supply mode the power outlet 10 may supply the power to the loads connected to the power outlet 10. It is worth noting that, however, the first power supply mode may be the mode in which the power outlet 10 may not provide the power to the loads. In other words, depending on the configuration or definition of the first power supply mode the power outlet 10 may provide or not provide the power to the loads.

The configuration method may further include setting the initial time value according to the configuration signal by the control unit 101 in step S103, and causing the control unit 101 to drive the notification unit 111 to generate the first notification signal, which may be used for indication of the receipt of the configuration setting for the switch to the power supply mode and presentment of the information of the initial time value in step S105. Thereafter, the method may count down from the initial time value (step S107) before causing the control unit 101 to determine whether any predetermined condition for informing the human operators of how much time left before the switch to the power supply mode of the power outlet 10 may start is satisfied (step S109). In one implementation, the control unit 101 may determine whether counting down from the initial time value reaches to a point where the predetermined condition is satisfied. When the predetermined condition is satisfied, the control unit 101 may be caused to drive the notification unit 111 for the generation of the second notification signal for the presentment of the information regarding how much time left before the switch to the power supply mode of the power outlet 10 (step S111).

Otherwise, the method may further include continuing counting down and determining whether counting down from the initial time value has completed (i.e., no time left before the switch to the power supply mode of the power outlet 10) in step S113. If so, the control unit 101 may be configured to control the switching unit 107 for switching the power outlet 10 from the first power supply mode to the second power supply mode (step S115). Otherwise, step S109 may be repeated. It is worth noting that the first power supply mode and the second power supply mode are distinct from each other. For example, if the first power supply mode is representative of the power outlet 10 supplying the power to the loads the second power supply mode may be indicating that the power outlet 10 supplies no power to the loads.

Second Embodiment According to the Instant Disclosure

Figure 5:
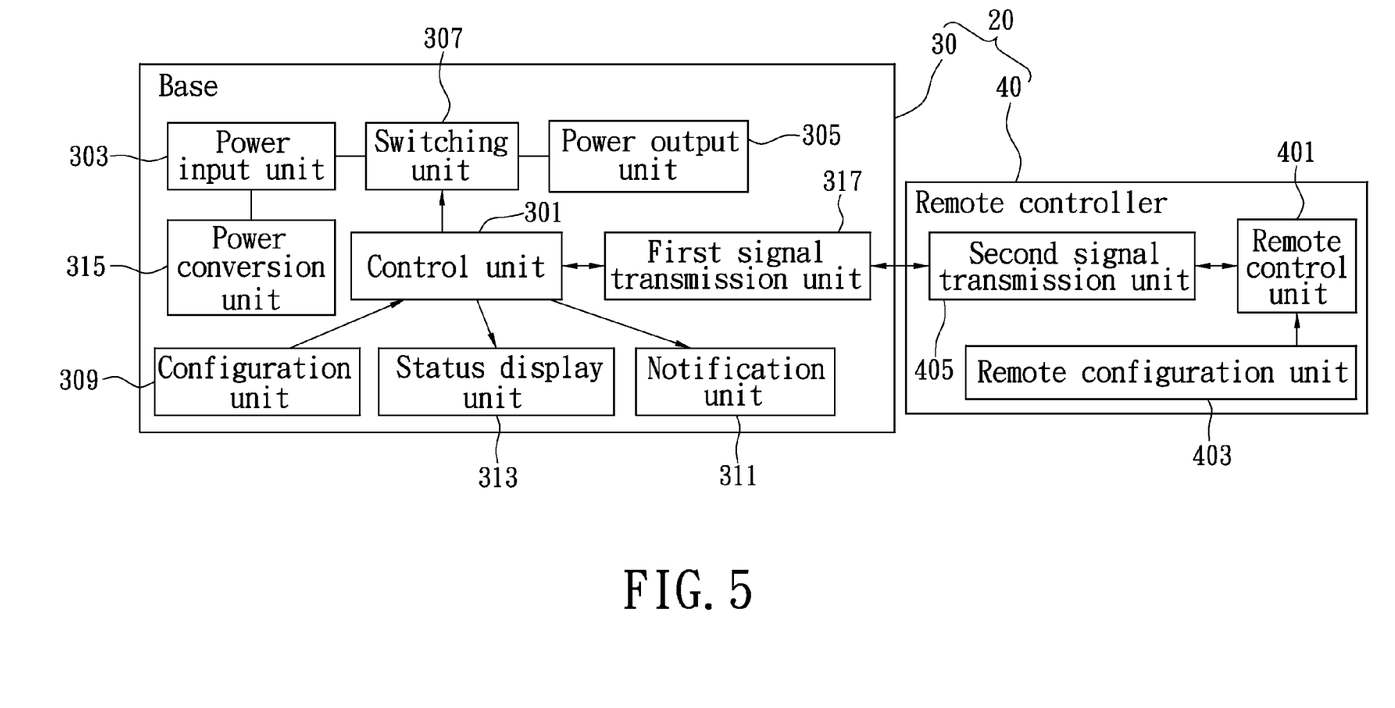
FIG. 5 illustrates a simplified block diagram of another embodiment in accordance with the instant disclosure.
Figure 6:
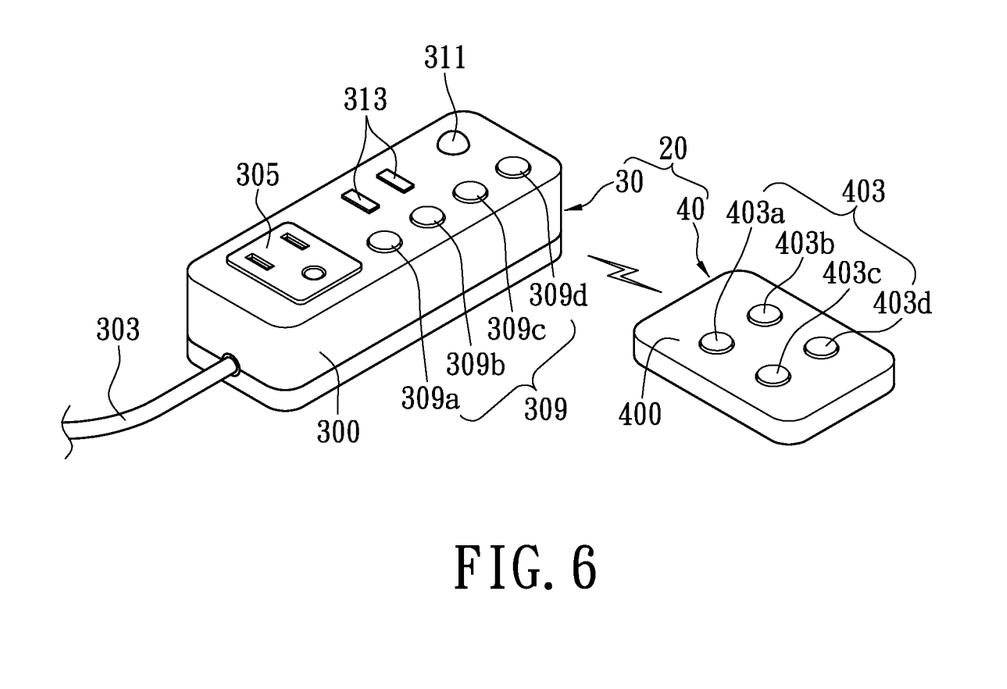
FIG. 6 is illustrative of a schematic diagram of another embodiment in accordance with the instant disclosure.

Please refer to FIGS. 5 and 6 illustrative of a simplified block diagram and a schematic diagram of another embodiment in accordance with the instant disclosure.

As shown in FIGS. 5 and 6, a power outlet 20 may include a base 30 and a remote controller 40. The base 30 may contain a control unit 301, a power input unit 303, a power output unit 305, a switching unit 307, a configuration unit 309, a notification unit 311, a status display unit 313, a power conversion unit 315, and a first signal transmission unit 317. The base 30 may further have a housing 300, and the remote controller 40 may include a remote control unit 401, a remote configuration unit 403, and a second signal transmission unit 405 in addition to a housing 400.

The configuration unit 309 may be adapted to set up when the power supply mode of the power outlet 20 may switch. The remote controller 40 may serve as another operating interface for the power outlet 20 through which the remote configuration unit 403 of the remote controller 40 may achieve the same goal of setting up when the power supply mode of the power outlet 20 may switch. It is worth noting that the remote controller 40 and the base 30 may communicate with each other through the second signal transmission unit 405 and the first signal transmission unit 317, respectively. In one implementation, both the first signal transmission unit 317 and the second signal transmission unit 405 may be capable of transmitting signals between the base 30 and the remote controller 40 in a wireless manner.

The configuration unit 309 may include buttons 309a-309d, with the remote controller 40 having buttons 403a-403d, each of which may correspond to one of the buttons 309a-309d of the configuration unit 309. The buttons 403a-403d may be activated externally to generate corresponding configuration signals, which may be received by the remote control unit 401. And the remote control unit 401 may further encode the received configuration signals before the second signal transmission unit 405 may wirelessly transmit the encoded configuration signals so that the first signal transmission unit 317 of the base 30 may receive the encoded configuration signals. Thereafter, the control unit 301 may decode the encoded configuration signals and set up the initial time values for the count-downs to start.

It is worth noting that despite the base may have the configuration unit 309 in the above embodiment the configuration unit 309 may not be necessary as the remote configuration unit 401 in the remote controller 40 may function as the configuration unit 309 to properly configure the countdown of the power outlet 20.

Third Embodiment of the Instant Disclosure

Figure 7:
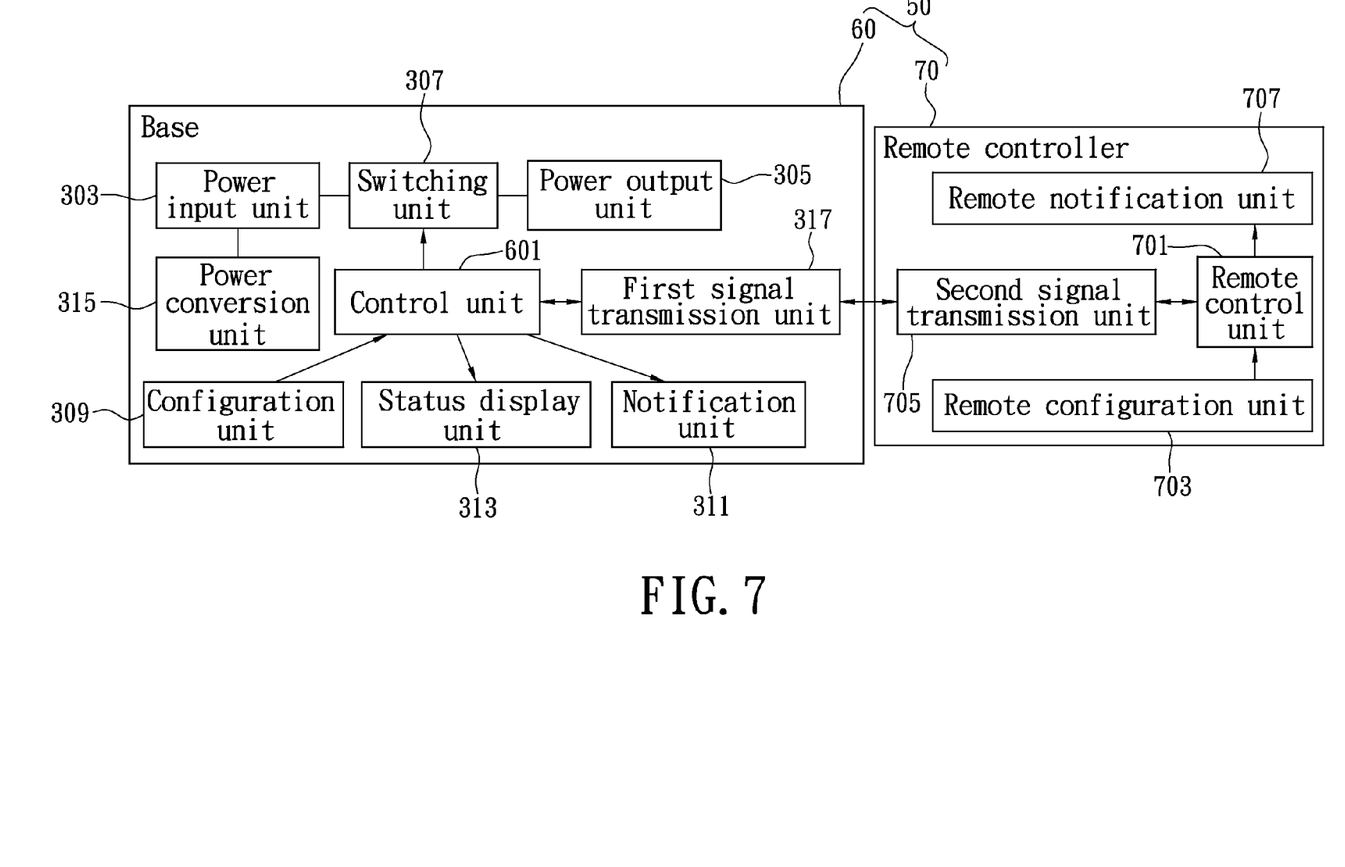
FIG. 7 is a simplified block diagram showing another embodiment according to the instant disclosure.
Figure 8:
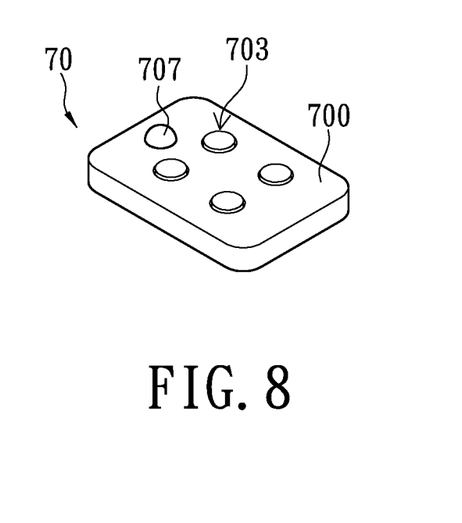
FIG. 8 illustrates a schematic diagram of another embodiment according to the instant disclosure.

Please refer to FIGS. 7 and 8 illustrative of a simplified block diagram and a schematic diagram according to another embodiment of the instant disclosure. A power outlet 50 may include a base 60 and a remote controller 70 having a remote control unit 701, a remote configuration unit 703, a second signal transmission unit 705, and a remote notification unit 707. In one implementation, the remote notification unit 707 may serve as the notification unit 311 so that the remote controller 70 may be not only another operating interface for the power outlet 50 but also another interface for presentment of information of the power outlet 50.

Specifically speaking, when the control unit 601 receives the configuration signals for the initial time values to be set up both the notification unit 311 of the base 60 and the remote notification unit 707 may be driven to generate the first notification signal. In one implementation, the remote notification unit 707 may generate the first notification signal as the generation of the first notification or the preparation for the generation of the same may prompt the remote control unit 701 to cause the remote notification unit 707 to generate the first notification signal as well. And for the remote control unit 701 to be caused to control the remote notification unit 707 to generate the first notification signal a corresponding command outputted by the control unit 601 may be delivered to the remote controller 70 through the communication between the first signal transmission unit 317 and the second signal transmission unit 705. The generation of the second notification signal by the remote controller may be caused in the similar way upon the control unit 601 drives the notification unit 311 to generate the second notification signal.

Fourth Embodiment of the Instant Disclosure

Figure 9:
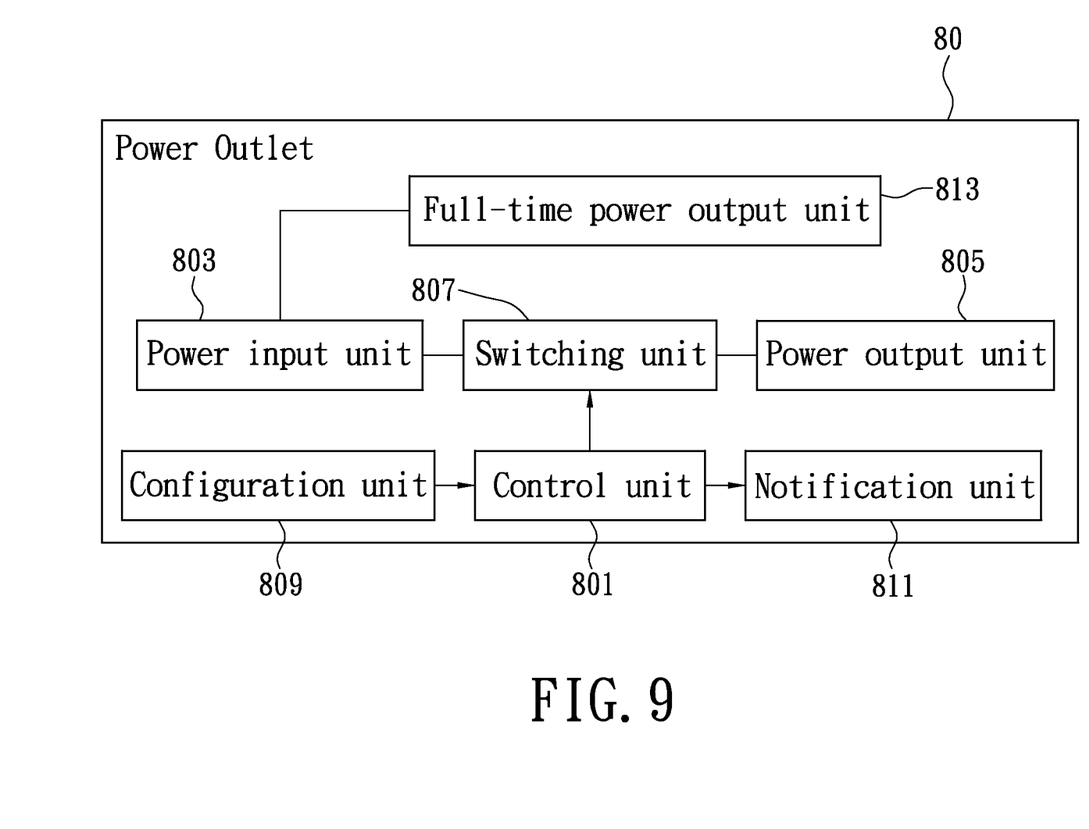
FIG. 9 illustrates a simplified block diagram of another embodiment according to the instant disclosure.

Please refer to FIG. 9 illustrative of a simplified block diagram of another embodiment according to the instant disclosure. A power outlet 80 may include a control unit 801, a power input unit 803, a power output unit 805, a switching unit 807, a configuration unit 809, a notification unit 811, and a full-time power output unit 813. With the full-time power output unit 813, the power outlet 80 may selectively cause one socket thereof to be supplying the power to the loads disregarding the setting of the initial time values for the purpose of the switch to the power supply mode at other sockets.

The descriptions illustrated supra set forth simply the embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A power outlet capable of providing power in a controlled manner, comprising:
 a notification unit;
  a power input unit for receiving a power;
  a power output unit for outputting the power;
  a switching unit having a controlled switch, for controlling the power input unit to be connected to or disconnected from the power output unit, in order to control a power supply mode of the power outlet;
  a configuration unit for generating a configuration signal; and
  a control unit, according to the configuration signal, for setting up an initial time value, driving the notification unit to generate a first notification signal, and counting down from the initial time value;
  wherein, when the control unit counts down from the initial time value to a point where a predetermined condition is satisfied the control unit is configured to drive the notification unit to generate a second notification signal;
  wherein, when the control unit counts down from the initial time value to zero the control unit is configured to cause the switching unit to switch the power supply mode.

2. The power outlet according to claim 1, wherein the first notification signal is for presenting information regarding the initial time value and the second notification signal is for presenting how much time left before the switching unit is caused to switch the power supply mode of the power outlet.

3. The power outlet according to claim 2, wherein the notification unit is made from components selected from a group consisting of a lighting element and a sounding element so that the first notification signal and the second notification signal are presented in terms of operations of the lighting element and the sounding element.

4. The power outlet according to claim 1, wherein the configuration unit further comprises a plurality of buttons when activated externally for generating the configuration signal.

5. The power outlet according to claim 4, further comprising a base having the power input unit, the power output unit, the switching unit, the control unit, and a first signal transmission unit, and a remote controller having a configuration unit, a remote control unit, and a second signal transmission unit, with the configuration signal being wirelessly outputted from the second signal transmission unit before being received by the first signal transmission unit and transmitted to the control unit.

6. A method for switching a power outlet capable of providing power in a controlled manner between a first power supply mode and a second power supply mode, the power outlet having a notification unit, comprising:

receiving a configuration signal when the power outlet operates in the first power supply mode;

setting up an initial time value according to the configuration signal;

driving a notification signal to generate a first notification signal for presenting the initial time value;

counting down from the initial time value;

when counting down from the initial time value to a point where a predetermined condition is satisfied driving the notification unit to generate a second notification signal; and switching the power outlet from the first power supply mode to the second power supply mode when counting down from the initial time value to zero.

7. The method according to claim 6, wherein the predetermined condition is satisfied when counting down from the initial time value to when a predetermined integer number of hours is left before switching the power outlet from the first power supply mode to the second power supply mode.

8. The method according to claim 6, wherein the second notification signal is for presenting how much time left before the control unit switches the power outlet from the first power supply mode to the second power supply mode.

9. The method according to claim 8, wherein the notification unit is made from components selected from a group consisting of a lighting element and a sounding element so that the first notification signal and the second notification signal are presented in terms of operations of the lighting element and the sounding element.

10. The power outlet according to claim 8, wherein the first notification signal is for presenting information regarding the initial time value.

11. The power outlet according to claim 10, wherein the notification unit is made from components selected from a group consisting of a lighting element and a sounding element so that the first notification signal and the second notification signal are presented in terms of operations of the lighting element and the sounding element.

* * * * *